United States Patent [19]

Andreucci et al.

[11] 4,276,638

[45] Jun. 30, 1981

[54] FREQUENCY MULTIPLEXED RADIO LINK APPARATUS

[75] Inventors: Pierre Andreucci; Jacques Moron, both of Massy, France

[73] Assignee: Commissariat a l'Energie Atomique, Paris, France

[21] Appl. No.: 49,484

[22] Filed: Jun. 15, 1979

[30] Foreign Application Priority Data

Jun. 27, 1978 [FR] France .................... 78 19109

[51] Int. Cl.³ .................... H04L 5/14; H04B 1/50
[52] U.S. Cl. .................... 370/30; 455/15; 455/57
[58] Field of Search .................... 343/176, 175, 205; 325/5, 9, 53, 54; 179/15 FD; 370/30, 24, 69; 455/15, 17, 20, 49, 53, 57

[56] References Cited

U.S. PATENT DOCUMENTS

| 1,607,682 | 11/1926 | Martin | 325/5 |
|---|---|---|---|
| 1,698,777 | 1/1929 | Bown | 325/5 |
| 4,131,849 | 12/1978 | Freeburg et al. | 325/54 |

FOREIGN PATENT DOCUMENTS

2347839 11/1977 France .

OTHER PUBLICATIONS

"Transistor for the Era of Microwave Communication", by Kakihana Wescon Technical Papers, vol. 15, 1971, pp. 26/3-1–26/3-6.

"Short Range Communications by VHF Radio", GEC Communications, vol. 1, No. 2, 1946, p. 67.

*Primary Examiner*—Douglas W. Olms
*Attorney, Agent, or Firm*—Haseltine and Lake

[57] ABSTRACT

Apparatus for frequency multiplexed radio links between a control transceiver and at least two operator transceivers, said apparatus being of the type in which the control transceiver comprises on the one hand a transmitter receiving a low frequency signal from a microphone and transmitting a high frequency wave Fe and on the other the same number of receivers as there are operator transceivers, each receiver being adjusted to a particular high frequency Fi which differs from Fe, each receiver supplying a low frequency signal which is directed to a loudspeaker and in which each operator transceiver comprises on the one hand a receiver adjusted to the said frequency Fe and supplying a loudspeaker and on the other a transmitter connected to a microphone and operating on one of the said frequencies Fi, wherein it also comprises means located in the control transceiver for reinjecting part of the low frequency signals supplied by each of the receivers of the control transceiver into the transmitter of said transceiver.

4 Claims, 3 Drawing Figures

FREQUENCY MULTIPLEXED RADIO LINK APPARATUS

BACKGROUND OF THE INVENTION

The present invention relates to a multiplexed frequency radio linked apparatus. In general terms, it is used in telecommunications and is more specifically used in the construction of phonic communication means between a number of persons remote from one another or who are insulated from one another as a result of wearing tightly sealed suits, which is in particular the case with persons working in a hostile medium and more specifically in enclosures for the decontamination of radioactive materials and objects.

Operators working on such enclosures wear ventilated clothes which entirely insulate them from the ambient medium. These special working conditions make it necessary both for safety reasons, as well as for efficiency and comfort to use communications means between the operators and the persons located within the enclosure.

Under such conditions, apparatus having wires are not generally satisfactory due to the permanent risk of the wires breaking and of the poor quality of the connection.

Therefore, in the prior art, a wire-less connection system by electomagnetic wave has been used. Such a system comprises a number of transceivers, each operator having such a transceiver at his disposal, hereinafter called the operator transceiver, whilst the person located outside the enclosure has another transceiver, hereinafter called the control transceiver. In improved systems, each of the communication channels established between the operator transceiver and the control transceiver can be on a special frequency in order to obviate the interference between messages emanating from different operators. Thus, a frequency multiplexed system is obtained. Naturally, this makes it necessary for the control transceiver to be equipped with the same number of receivers as there are operator transceivers, whereby each of said receivers works on a special frequency. The control transceiver can be equipped with the same number of transmitters as there are operator transceivers, but it is only possible to use a single transmitter, the receivers of the operator transceivers then being all identical.

The disadvantage of such a system is obvious. Although the operators are able to converse with the person controlling the work, positioned outside the decontamination enclosure, they are unable to converse with one another. If it is desired to give the operator such a facility, it is necessary to duplicate the equipment of each operator by adding a transceiver able to establish communications between the individual operators.

BRIEF SUMMARY OF THE INVENTION

The object of the invention is such an apparatus, but which also gives the operators the possibility of communicating with one another without it being necessary to add supplementary means to the operator transceivers. Moreover, the apparatus according to the invention does not require on the part of the operators any manipulation of switching members, particularly during the passage between a reception phase and a transmission phase.

According to the invention, this object is achieved through the use of means disposed in the control transceiver and which are able to reinject into the transmitter thereof the low frequency signal supplied by the receivers thereof. Thus, messages can pass from one operator to another via the control transceiver.

More specifically, the present invention relates to an apparatus for frequency multiplexed radio links between a control transceiver and at least two operator transceivers, said apparatus being of the type in which the control transceiver comprises on the one hand a transmitter receiving a low frequency signal from a microphone and transmitting a high frequency wave Fe and on the other the same number of receivers as there are operator transceivers, each receiver being adjusted to a particular high frequency Fi which differs from Fe, each receiver supplying a low frequency signal which is directed to a loudspeaker and in which each operator transceiver comprises on the one hand a receiver adjusted to the said frequency Fe and supplying a loudspeaker and on the other a transmitter connected to a microphone and operating on one of the said frequencies Fi, wherein it also comprises means located in the control transceiver for reinjecting part of the low frequency signals supplied by each of the receivers of the control transceiver into the transmitter of said transceiver.

BRIEF DESCRIPTION OF THE DRAWINGS

The invention will be better understood from the following description of non-limitative embodiments, with reference to the attached drawings, wherein show.

DETAILED DESCRIPTION OF THE PREFERRED EMBODIMENTS

Figure 1:
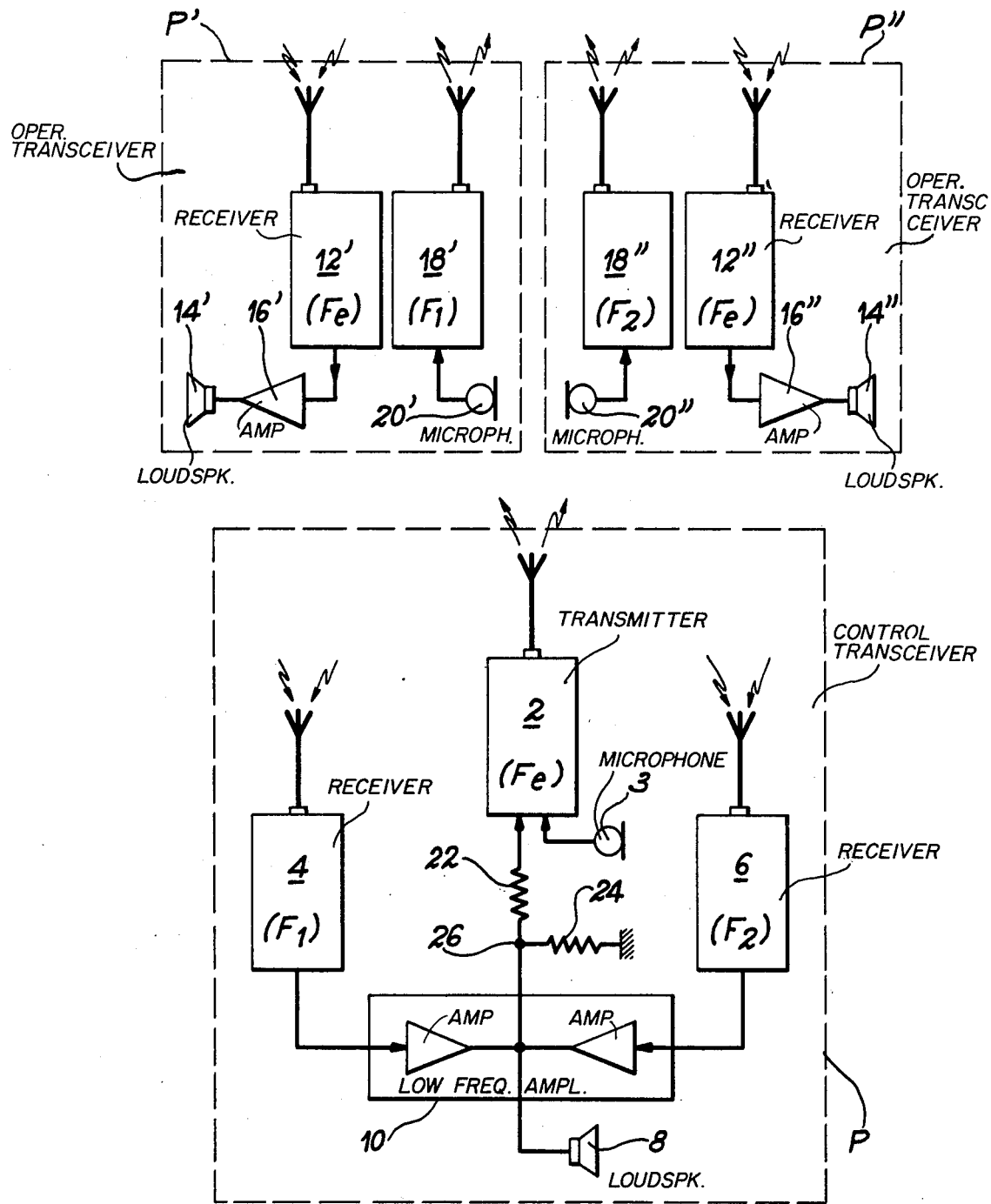
FIG. 1 a synoptic diagram of an apparatus according to the invention.

Although the invention applies to the general case where it is desired to establish a link between a control transceiver and a random number (over 2) of operator transceivers, FIG. 1 refers in an explanatory manner to the special case where the number of said operator transceivers is equal to 2.

In FIG. 1, the apparatus shown comprises two operator transceivers P' and P'' and a control transceiver P. The latter comprises on the one hand a transmitter 2 which receives a low frequency signal from a microphone 3 and which transmits a high frequency wave Fe and on the other two receivers 4 and 6 respectively adjusted to the different high frequencies $F_1$ and $F_2$ of Fe and each supplying a low frequency signal directed to a loudspeaker 8 through an amplifier circuit 10.

Each operator transceiver P' and P'' comprises on the hand a receiver 12' (12'') adjusted to the frequency Fe and supplying a loudspeaker 14' (14'') via an amplifier 16' (16'') and on the other hand a transmitter 18' (18'') connected to a microphone 20' (20''), the transmitters 18' and 18'' respectively operating on the frequencies $F_1$ and $F_2$.

The apparatus shown also comprises according to the invention means located in the control transceiver P for reinjecting part of the low frequency signal supplied by each of the receivers 4 and 6 of the control transceiver into the transmitter 2 of said transceiver. In the illustrated embodiment, these means are constituted by a resistance bridge formed by two resistors 22 and 24, whose central point 26 is connected to the low frequency amplifier circuit 10.

The apparatus operates in the following manner. As each operator has a transceiver 3' or 3" he is able to establish a phonic link with the person who has the control transceiver P. The means used in such a link are on the outward path, transmitter 18' (or 18") operating on frequency $F_1$ (or $F_2$), receiver 4 (frequency $F_1$) or receiver 6 (frequency $F_2$) and return path transmitter 2 of the control transceiver P and receiver 12' (or 12").

The communication between two operators having respectively transceivers P' and P" is effected by the channel of the control transceiver P due to the reinjection into the transmitter 2 of low frequency signals supplied by the two receivers 4 and 6. The link between the operator having transceiver P' and the operator having transceiver P" is routed on the outward path via transmitter 18', receiver 4, transmitter 2 and receiver 12" and on the return path via transmitter 18", receiver 6, transmitter 2 and receiver 12'.

It is pointed out that this communication between the operators exist permanently, without it being necessary for them to manipulate switching members and that the control transceiver is in control of the communications, even if he is not directly involved in them, because he is never insulated from the operator transceivers.

Although any transceiver or receiver circuit can be used in the apparatus of the invention, two special embodiments of such circuits will now be described in an illustrative and non-limitative manner.

Figure 2:
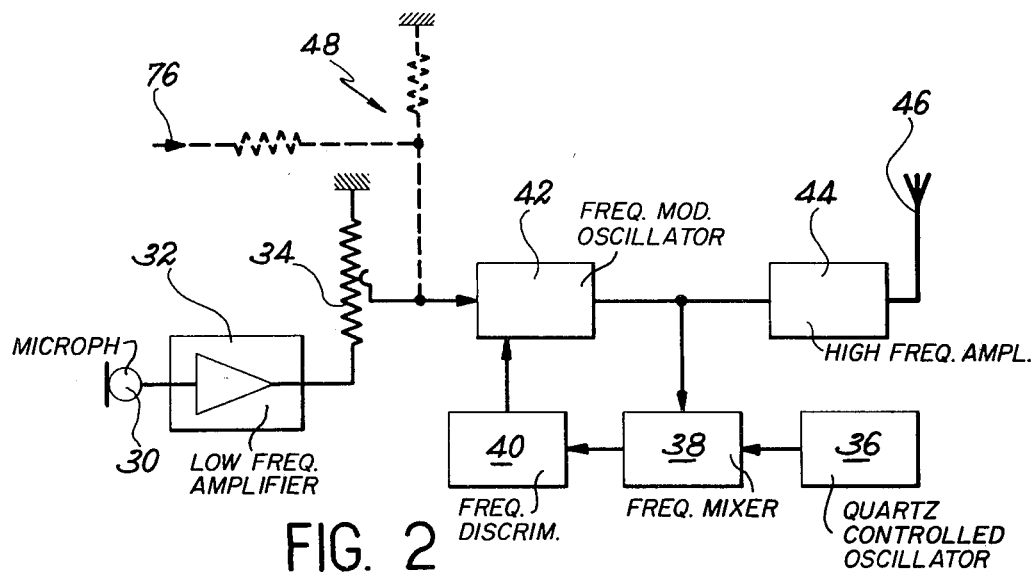
FIG. 2 the synoptic diagram of a transmitter which can be used in the apparatus according to the invention.

Firstly, FIG. 2 illustrates the synoptic diagram of a transmitter circuit which comprises, connected to a microphone 30, a low frequency amplifier 32, a potentiometer 34, a quartz-controlled oscillator 36, a frequency mixer 38, followed by a frequency discriminator 40 connected to a frequency modulated oscillator 42 and finally a high frequency amplifier 44 coupled to an antenna 46. If this transmitter is incorporated into the control transceiver, it also comprises a resistance bridge 48, whose input is connected to the receiver of the transceiver by connection 76 so that the low frequency signal supplied by these receivers are reinjected with the low frequency signal supplied by amplifier 32 into the circuit 42 belonging to the transmission stage.

Figure 3:
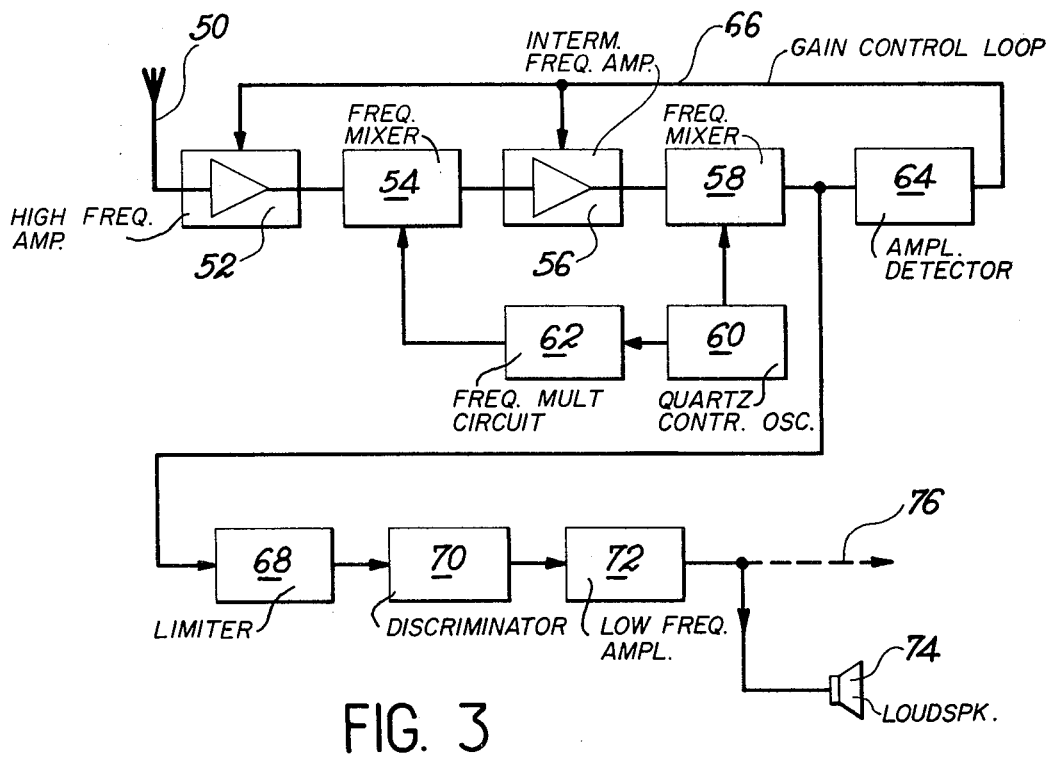
FIG. 3 the synoptic diagram of a receiver circuit which can be used in the apparatus according to the invention.

For explanatory purposes, the applicant has successfully used transmitters of the trade mark MELODIUM, type EC 23, whose main characteristics are as follows:
frequencies: 36.4–32.8–39.2 MHz;
modulation type: frequency modulation;
power radiated by the antenna: 1 mW;
nominal frequency drift: ±50 kHz;
preaccentuation: 50 μs;
low frequency response curve: 20 kHz to 20 Hz ±2 db relative to the preaccentuation curve;
sensitivity at 1 kHz: 0.6 mV for a drift of ±50 kHz;
modulation level: 20 db;
signal/noise ratio above 50 db for 0.6 mV at the input;
consumption: approx. 15 mA A possible synoptic diagram for the receivers is given in FIG. 3. The illustrated circuit comprises, following downstream of antenna 50, a high frequency amplifier 52, a first frequency mixer 54 followed by an intermediate frequency amplifier 56, itself followed by a second frequency mixer circuit 58 which receives from a local quartz-controlled oscillator 60 a signal which is also applied to a frequency multiplier circuit 62, whose output is applied to the first mixer circuit 54. An amplitude detection circuit 64 makes it possible to supply an automatic gain control loop 66. The circuit is completed by a medium frequency amplifier and limiter 68 connected to a discrimination and deaccentuation circuit 70, connected to a low frequency amplifier 72 which controls a loudspeaker 74.

If the illustrated receiver circuit constitutes one of the receivers of the control transceiver, a connection 76 is provided downstream of the low frequency amplification circuit 72 in order to permit the reinjection of part of the low frequency signal into the transmission circuit, said connections 76 being shown in the diagram of FIG. 2, as indicated hereinbefore.

For explanatory purposes, the Applicant has successfully used a receiver of the trade name MELODIUM, whose main characteristics are as follows:
input impedance: 50 Ω
sensitivity: electromotive force=1.5 μV for a signal/noise ratio at 26 db, a frequency drift of ±50kHz and a modulation frequency of 1 kHz;
signal/noise ratio above 40 db for an electromotive force of 3 μV, above 55 db for an electromotive force of 20 μV;
protection against amplitude modulation: above 40 db for an antenna electromotive force between 1082 V and 200 mV in carrier frequency, a modulation frequency of 500 Hz and a depth of 50%;
protection against the first image frequency at 800 kHz; above 30 db;
protection against a jamming or interfering station at a distance greater than 1.5 MHz: above 50 db;
variation in the output low frequency level: below 0.5 db for an antenna signal between 3 μV and 200 mV;
tolerance of transmission frequency: ±100 kHz for an antenna signal between 20 μV and 200 mV;
consumption: approx. 18 mA.

Among the possible frequencies which can be used are those authorised by the French Department of Posts and Telecommunications, mainly 32.8, 36.4 and 39.2 mHz. The transmitter of the control transceiver is then adjusted for example to 32.8 MHz, the two receivers of the secondary transceivers being calibrated to those frequencies. One of the transmitters of the secondary transceivers is adjusted to 36.4 MHz and the second to 39.2 MHz. The two receivers of the control transceiver are then respectively adjusted to the frequencies 36.4 and 39.2 MHz.

The invention is not limited to the embodiments described and represented hereinbefore and various modifications can be made thereto without passing beyond the scope of the invention.

What is claimed is:

1. An apparatus for frequency multiplexed radio links between a control transceiver and at least two operator transceivers, said apparatus being of the type in which the control transceiver comprises a transmitter receiving a low frequency signal from a microphone and transmitting a high frequency wave Fe and receivers equal in number to the operator transceivers, each receiver being adjusted to a particular high frequency Fi which differs from Fe, each receiver supplying a low frequency signal which is directed to a loudspeaker and in which each operator transceiver comprises a receiver adjusted to said frequency Fe and supplying a loudspeaker and a transmitter connected to a microphone and operating on one of the said frequencies Fi, and means located in the control transceiver for reinjecting part of the low frequency signals supplied by each of the receivers of the control transceiver into the transmitter of said transceiver.

2. An apparatus according to claim 1, wherein the control transceiver comprises a transmitter constituted by a low frequency preamplification stage connected to the microphone then a frequency modulation stage followed by a high frequency amplifier connected to an antenna, the means for reinjecting parts of the low frequency signals being positioned downstream of the preamplification stage and upstream of the modulation stage.

3. An apparatus according to claim 2, wherein the preamplification stage is terminated by a regulating potentiometer and the means for reinjecting the low frequency signals comprise a dividing resistance bridge connected to the output of said potentiometer.

4. An apparatus according to claim 1, wherein it comprises a control transceiver and two operator transceivers, the three transmission frequencies of these three transceivers being selected from among the three frequencies 36.4, 32.8 and 39.2 MHz.

* * * * *